United States Patent
van Klooster

(10) Patent No.: US 12,140,605 B2
(45) Date of Patent: Nov. 12, 2024

(54) MEASURING DEVICE, SENSOR UNIT AND METHOD FOR DETERMINING AT LEAST ONE PARAMETER OF A MEDIUM

(71) Applicant: KROHNE AG, Basel (CH)

(72) Inventor: Jeroen Martin van Klooster, Tiel (NL)

(*) Notice: Subject to any disclaimer, the term of this patent is extended or adjusted under 35 U.S.C. 154(b) by 300 days.

(21) Appl. No.: 17/651,985

(22) Filed: Feb. 22, 2022

(65) Prior Publication Data
US 2022/0268680 A1 Aug. 25, 2022

(30) Foreign Application Priority Data
Feb. 22, 2021 (DE) .................. 10 2021 104 161.9

(51) Int. Cl.
*G01N 9/32* (2006.01)
*G01F 1/38* (2006.01)
*G01N 11/04* (2006.01)

(52) U.S. Cl.
CPC .............. *G01N 9/32* (2013.01); *G01F 1/38* (2013.01); *G01F 1/383* (2013.01); *G01N 11/04* (2013.01)

(58) Field of Classification Search
CPC .. G01N 9/32; G01N 11/04; G01F 1/38; G01F 1/383; G01L 7/08; G01L 7/082; G01L 7/084; G01L 23/02
See application file for complete search history.

(56) References Cited

U.S. PATENT DOCUMENTS

| 8,733,162 B2 | 5/2014 | Wood et al. |
| 10,881,818 B2 * | 1/2021 | Costella ............... A61B 5/0876 |
| 2014/0116138 A1 | 5/2014 | Sheverev et al. |
| 2015/0114134 A1 | 4/2015 | Van Klooster |
| 2016/0109348 A1 | 4/2016 | Robert et al. |
| 2020/0264087 A1 | 8/2020 | Berlinger et al. |

FOREIGN PATENT DOCUMENTS

DE 102015122124 A1 6/2017

* cited by examiner

*Primary Examiner* — Paul M. West
(74) *Attorney, Agent, or Firm* — Patrick D. Duplessis

(57) ABSTRACT

A measuring device with a measuring tube is disclosed. The measuring device includes a sensor unit for capturing a parameter of a medium, a control and evaluation unit, and a deflectable measuring sensor with a cavity and a base unit. The sensor unit is at least partially integrated in the wall of the measuring tube. The measuring sensor is connected to the base unit via a spring element. The base unit is arranged outside of the measuring tube. A side of the measuring sensor is in contact with the medium during operation. The cavity is arranged on the side of the measuring sensor facing the medium. The measuring sensor is integrated into the measuring tube wall in such a way that it can be deflected at least in the plane of the measuring tube wall. The sensor unit has a means for capturing the deflection of the measuring sensor.

15 Claims, 7 Drawing Sheets

MEASURING DEVICE, SENSOR UNIT AND METHOD FOR DETERMINING AT LEAST ONE PARAMETER OF A MEDIUM

TECHNICAL FIELD

The invention is based on a measuring device with a measuring tube suitable for guiding a medium, with at least one sensor unit, wherein the sensor unit is designed to capture at least one parameter of a medium, wherein the sensor unit is at least partially integrated into the measuring tube wall of the measuring tube, and with at least one control and evaluation unit. In addition, the invention relates to a sensor unit for determining at least one parameter of a medium, for installation in the measuring tube wall of a measuring tube through which the medium flows. Furthermore, the invention relates to a method for determining at least one parameter of a medium by means of a measuring device, wherein the measuring device comprises a measuring tube suitable for guiding the medium, at least one control and evaluation unit and at least one sensor unit, wherein the sensor unit is designed for capturing the at least one parameter of the medium, wherein the sensor unit is at least partially integrated into the measuring tube wall of the measuring tube.

BACKGROUND

Different ways of determining the flow rate of a flowing medium and of determining the density and viscosity of a medium are known from the prior art. In order to determine a plurality of parameters, known measuring devices frequently also have a plurality of sensor units.

SUMMARY

The object of the present invention is thus to provide a measuring device, wherein different parameters of a medium can be determined by means of one sensor unit. Furthermore, an object of the invention is to provide a corresponding sensor unit as well as a method for determining a plurality of parameters of a medium.

According to a first teaching, the object set out above is achieved by a measuring device described at the outset in that the sensor unit has at least one deflectable measuring sensor with at least one cavity and at least one stationary base unit, wherein the measuring sensor is connected to the base unit via at least one spring element, wherein the base unit is arranged outside the measuring tube interior, wherein at least one side of the measuring sensor is in contact with the medium during operation, and wherein the cavity is arranged on the side of the measuring sensor facing the medium, and wherein the measuring sensor is integrated in the measuring tube wall in such a way that it can be deflected at least in the plane of the measuring tube wall, and in that the sensor unit has a means for capturing the deflection of the measuring sensor.

According to the invention, it has been recognized that a measuring sensor having a cavity for receiving the medium to be measured changes at least one property and/or state as a result of contact with the medium. This change can be measured and at least one parameter of the medium, in particular a flow velocity, the density and/or the viscosity, can be determined from the change. In detail, the measuring sensor is thus integrated into the measuring tube in such a way that the medium only acts on the measuring sensor, but not on the base unit.

For example, it can be exploited that a flowing medium forms vortices in the at least one cavity of the sensor unit according to the invention, which, after exceeding the critical size, detach themselves from the cavity and cause the cavity and thus the deflectable sensor to oscillate. The oscillation of the sensor corresponds to the detachment frequency of the vortices. The velocity of the flowing medium can therefore be determined from this oscillation during operation.

In addition, the measuring sensor changes its total mass when the cavity is filled with the medium during operation. By comparing the eigenfrequency of an oscillating measuring sensor in the reference state and the eigenfrequency of an oscillating measuring sensor with the cavity filled with the medium, the density of the medium can be determined.

Furthermore, the damping of an oscillation with a single deflection can be captured, wherein the viscosity of the medium can be determined by comparing the damping in a reference state and the damping of an oscillation in the medium.

According to a first design, the sensor unit is arranged in the measuring tube in such a way that the side of the measuring sensor facing the medium is arranged substantially planar to the inner wall of the measuring tube. In this respect, the cavity of the sensor unit is arranged set back from the inner wall of the measuring tube. This design has the advantage that the sensor unit according to the invention does not have any installations protruding into the measuring tube that interfere with the flow.

Preferably, the sensor is integrated into the measuring tube wall in such a way that the sensor is completely surrounded by the medium during operation. Alternatively, the sensor can also be arranged in the measuring tube in such a way that only the side facing the medium is in contact with the medium.

Particularly preferably, the measuring tube has a rectangular cross section at least in the area of the sensor unit. Alternatively, the measuring tube can also have a round cross section.

A seal of the sensor unit to the medium can be implemented, for example, by means of at least one sealing ring and/or by means of a flexible membrane.

According to a next design, the means for capturing the deflection of the sensor unit can be designed as a piezoelectric element and/or as a strain gauge and/or as an inductive sensor and/or as a capacitive sensor and/or as an optical sensor and/or as a force gauge. In this case, the means for deflection in the area of the sensor unit can be arranged on the measuring tube or also on the sensor unit itself, in particular on the at least one spring element.

According to a particularly preferred design, the spring element is designed as a bending spring, in particular as a leaf spring. It is also preferred if the sensor is connected to the stationary base unit via at least two leaf springs. This design is inherently particularly stable.

According to a next design of the measuring device according to the invention, a means for active deflection of the measuring sensor is provided. This design has the advantage that not only the excitation of the sensor by the flowing medium can be evaluated, but that the sensor can also be excited, for example, by a single deflection into an oscillation in its eigenfrequency. If this excitation takes place in the flowing medium, at least one additional piece of information about the medium, in particular the density and/or viscosity of the medium, can be determined from the evaluation of this additional oscillation.

In this case, the eigenfrequency of the measuring sensor differs significantly from the detachment frequency of the vortices that form due to the flowing medium.

In this respect, the measuring device has the advantage that different properties of the medium can be determined in a particularly flexible manner by means of the active deflection as an alternative to or in combination with the oscillation excited by the flow.

The means for active excitation of the sensor unit is designed, for example, as an electromagnet and/or as a piezoelectric element.

According to a next design, the extent L of the cavity in a possible flow direction of the medium is greater than the depth of the cavity. The ratio L/D>3, in particular L/D=4, is particularly preferred. This design ensures a sufficiently stable generation of the vortices that excite the measuring sensor to oscillation. According to one design, the shape of the cavity is rectangular, in particular square or round, in particular elliptical.

According to a next design, the mass of the measuring sensor is as low as possible so that, in particular, the change in the eigenfrequency of the measuring sensor can be measured particularly well in the event of a change in the mass due to the accommodation of the medium in the cavity.

For example, the measuring sensor is at least partially made of aluminum or titanium or plastic. In addition, material recesses may also be provided at suitable locations to further reduce the mass of the measuring sensor.

According to a next design, the deflectable sensor is connected to a mass unit via a further spring element, so that the combination of the sensor and the mass unit forms a coupled spring-mass system. During operation, this system can be deflected in the reference state in such a way that it resonates. For this purpose, the measuring sensor and the mass unit preferably have the same eigenfrequencies. If a mass is now changed during operation, for example by the cavity filling with the medium to be measured, the coupled spring-mass system comes out of resonance, wherein the density of the medium can be inferred from the difference in amplitude of the oscillations of the measuring sensor and the mass unit. This design has the advantage that the measurement of the density of the medium is particularly sensitive.

According to a next design, the measuring device comprises at least two sensor units integrated in the measuring tube wall. For example, the at least two sensor units may be arranged on opposite sides of the measuring tube wall. The at least two sensor units may have the same cavity shape, but it is particularly preferred if the cavities have a different shape and/or a different size.

The presented designs of the measuring device have the overall advantage that the flow rate and/or the density and/or the viscosity of a flowing medium can be determined particularly flexibly by means of the measuring device.

According to a next design, the sensor unit can be miniaturized and manufactured by means of a microsystem technology process.

According to a second teaching of the present invention, the object set out at the beginning is achieved by a sensor unit described at the beginning in that the sensor unit has at least one deflectable measuring sensor with at least one cavity and at least one fixable base unit,
wherein the measuring sensor is connected to the base unit by means of at least one spring element,
wherein at least one side of the sensor is in contact with the medium during operation, and wherein the cavity is arranged on the side of the sensor facing the medium, and that the sensor unit has a means for capturing the deflection of the sensor.

Particularly preferably, the sensor unit is formed according to one of the designs described above.

According to a third teaching of the present invention, the object set out at the beginning is achieved by a method described at the beginning for determining at least one parameter of a flowing medium in that the sensor unit has at least one deflectable measuring sensor with at least one cavity and at least one stationary base unit,
wherein the measuring sensor is connected to the base unit by means of at least one spring element, wherein the base unit is arranged outside the measuring tube interior,
wherein at least one side of the measuring sensor is in contact with the medium and wherein the cavity is arranged on the side of the measuring sensor facing the medium, wherein the measuring sensor is integrated in the measuring tube wall in such a way that it can be deflected at least in the plane of the measuring tube wall,
that the sensor unit has a means for capturing the deflection of the measuring sensor,
and that the method comprises the following steps:
exciting the measuring sensor to oscillation in the plane of the measuring tube wall,
capturing the frequency and/or amplitude of the oscillation by the means for detecting the deflection,
determining the at least one parameter from the measured frequency and/or the amplitude by the control and evaluation unit.

According to a first design of the method, the excitation of the measuring sensor to oscillation is effected by the flowing medium, wherein the flow velocity of the medium is determined from the frequency of the oscillation of the measuring sensor.

In detail, vortices are formed in the cavity, which detach from the cavity when a critical value is exceeded. The formation of the vortices and the detachment from the cavity cause the measuring sensor to oscillate.

The following relationship applies to the detachment frequency:

$$St = \frac{f \cdot D}{U},$$

where $S_t$=Strouhal number, f=detachment frequency [Hz], U=flow velocity [m/s] and D=characteristic size of the cavity, e.g. length or depth [m].

The Strouhal number can be assumed to be essentially constant over a wide range of Reynolds numbers. The detachment frequency corresponds to the oscillation frequency to be measured of the measuring sensor.

According to a next design, a means for active deflection of the measuring sensor is provided, wherein alternatively or in addition to the excitation by the flowing medium, the excitation of the measuring sensor is effected by the means for active deflection.

For example, the measuring sensor is deflected once by the aforementioned means and thus excited to oscillate at the eigenfrequency.

According to a next design, the density of the medium can be determined from the frequency of the natural oscillation of the sensor. For this purpose, at least one value for the eigenfrequency under reference conditions, for example for the natural oscillation in air and/or in a known reference medium, is stored in the control and evaluation unit. If the eigenfrequency value changes because the cavity is filled with the medium so that the sensor has a different mass, the density of the medium can be determined from the change in the eigenfrequency.

The undamped eigenfrequency of a one-dimensional mass-spring system, where the combination of the sensor, the spring element and the stationary base unit corresponds to such a system, has the following relationship:

$$f_n = \frac{1}{2\pi} \cdot \sqrt{\frac{k}{m}},$$

where k is the spring constant of the spring element and m is the mass of the measuring sensor. In this respect, a change in the mass of the measuring sensor causes a change in the eigenfrequency of the above-mentioned oscillating system.

Alternatively or additionally, the viscosity of the medium can be determined from the damping of the oscillation of the measuring sensor.

The damped natural oscillation of a freely oscillating spring-mass system can be described as follows:

$$f_0 = f_n \cdot \sqrt{1-\xi^2}$$

where $f_0$ is the damped oscillation frequency and $\xi$ is the damping coefficient. The damping coefficient $\xi$ can be determined by the change in oscillation amplitude over time.

If the deflectable transducer is connected to a mass unit via another spring element so that the combination of the measuring sensor and the mass unit forms a coupled spring-mass system, and if the coupled spring-mass system is excited to oscillation, with the changes in the mass of the measuring sensor causing a perturbation of the resonance due to the absorption of the medium, the density of the flowing medium can be determined from the amplitude of the difference between the oscillation of the transducer and the oscillation of the mass unit. Determining the density via the aforementioned coupled spring-mass system has a particularly high sensitivity, so that density measurements can be made particularly accurately in this way.

BRIEF DESCRIPTION OF THE DRAWINGS

There is now a plurality of possibilities for designing and further developing the measuring device according to the invention, the sensor unit according to the invention and the method according to the invention. In this respect, reference is made to the following description of preferred embodiments in conjunction with the drawings.

DETAILED DESCRIPTION

Figure 1:
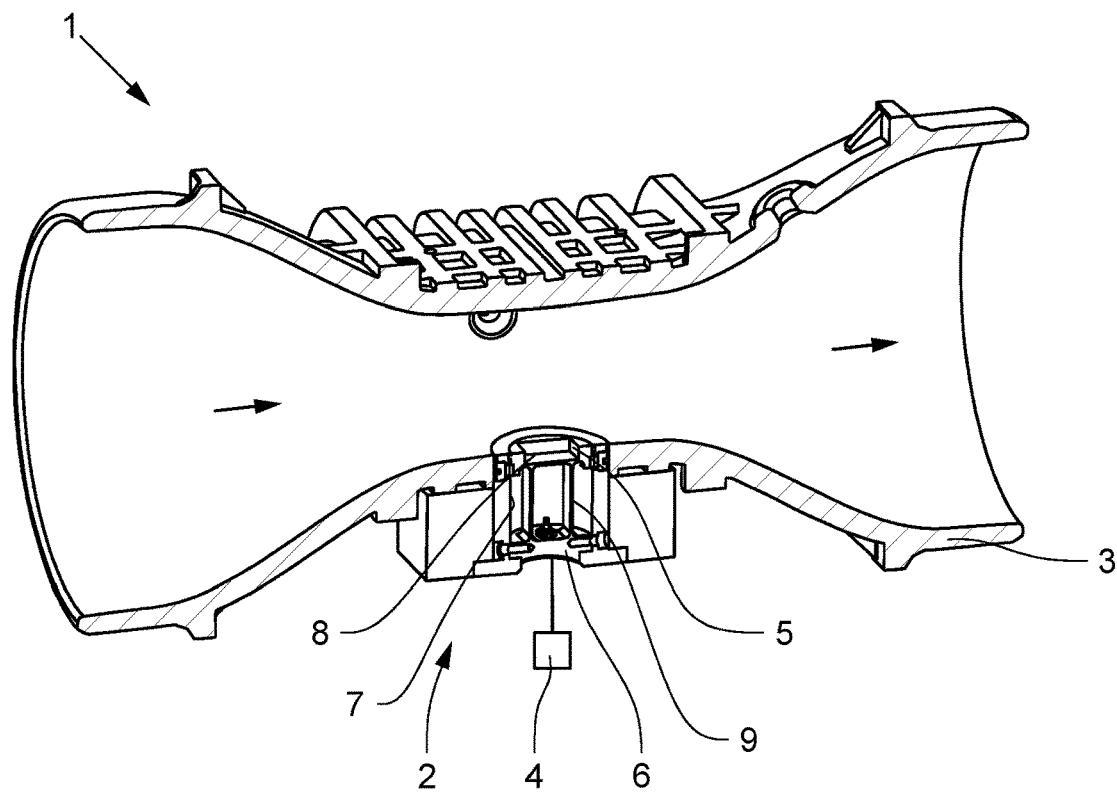
FIG. 1 illustrates a first embodiment of a measuring device according to the invention.

FIG. 1 shows a first embodiment example of a measuring device 1 according to the invention with a sensor unit 2, wherein the sensor unit 2 is designed to capture the flow velocity and/or the density and/or the viscosity of a flowing medium. The measuring device 1 further comprises a measuring tube 3 and a control and evaluation unit 4. The sensor unit 2 is integrated into the measuring tube wall in such a way that it is at least partially in contact with the medium flowing through the measuring tube 3 during operation.

The sensor unit 2 comprises a deflectable measuring sensor 5 and a stationary base unit 6, wherein the measuring sensor 5 is connected to the base unit 6 by means of a spring element 7. The sensor 5 is arranged in such a way that it is at least partially in contact with the medium during operation. In addition, the measuring sensor 5 has a cavity 8 on the medium side, wherein the cavity 8 receives the flowing medium during operation. Furthermore, the sensor 5 is arranged in such a way that it can be deflected in and against the flow direction of the flowing medium during operation. Furthermore, the sensor unit 2 has a means 9 for capturing the deflection of the measuring sensor 5.

In this respect, a measuring device 1 of a sensor unit 2 is shown, wherein the flow velocity and/or the density and/or the viscosity of the medium can be determined by means of the analysis of the deflection by the flowing medium and/or by means of the analysis of changes in the oscillation characteristics of the measuring sensor 5 by the flowing medium. Different parameters of the medium can thus advantageously be determined by means of the measuring device 1 shown.

Figure 2:
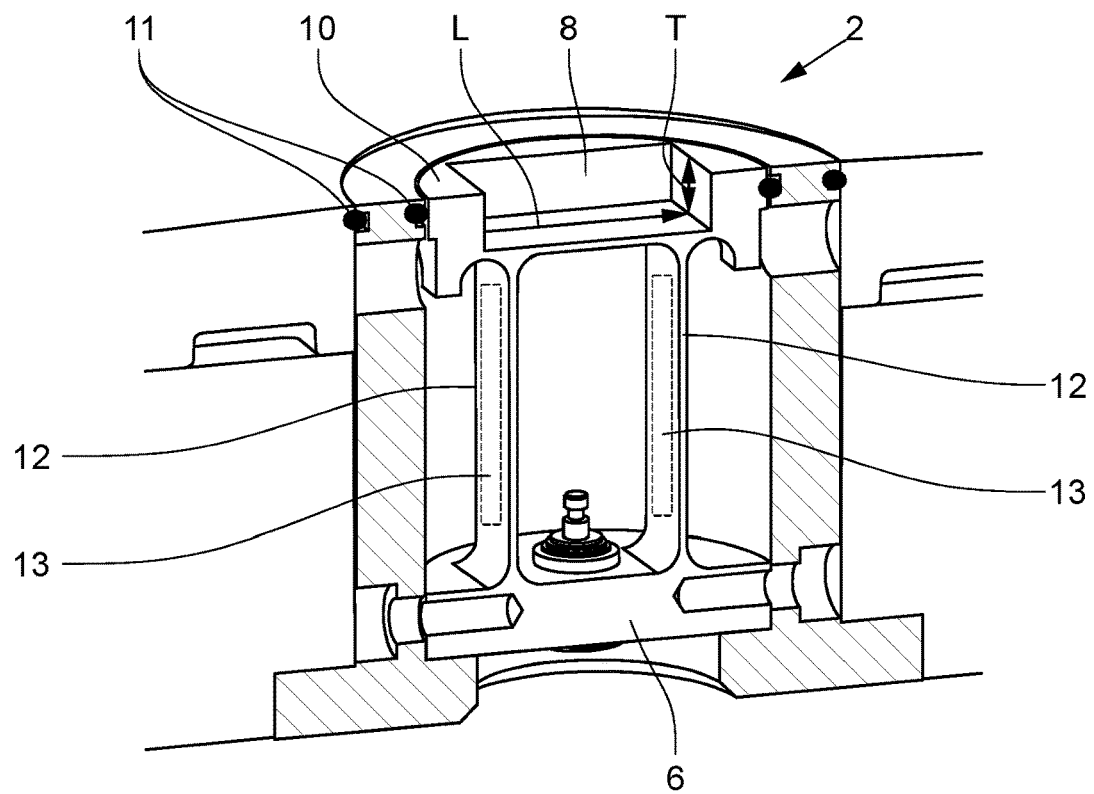
FIG. 2 illustrates an enlarged view of the sensor unit according to the invention in the installed state.

FIG. 2 shows an enlarged view of the sensor unit 2 shown in FIG. 1. It is shown that the measuring sensor 5 is integrated into the measuring tube wall in such a way that the medium-side surface 10 of the measuring sensor 5 is arranged essentially flat with the inner wall of the measuring tube. In addition, the cavity 8 arranged in the measuring sensor 5 has a rectangular basic shape, wherein the ratio of the extent of the cavity L to the depth of the cavity T is greater than 3. According to further embodiments, other geometries of the cavity 8 are also conceivable. The measuring sensor 5 is connected to the inner wall of the measuring tube by means of sealing rings 11. In addition, the measuring sensor 5 is arranged on the stationary base unit 6 by means of two leaf springs 12. Strain gauges 13 are attached to each of the leaf springs, by which the deflection or vibration of the measuring sensor 5 can be captured.

Figure 3:
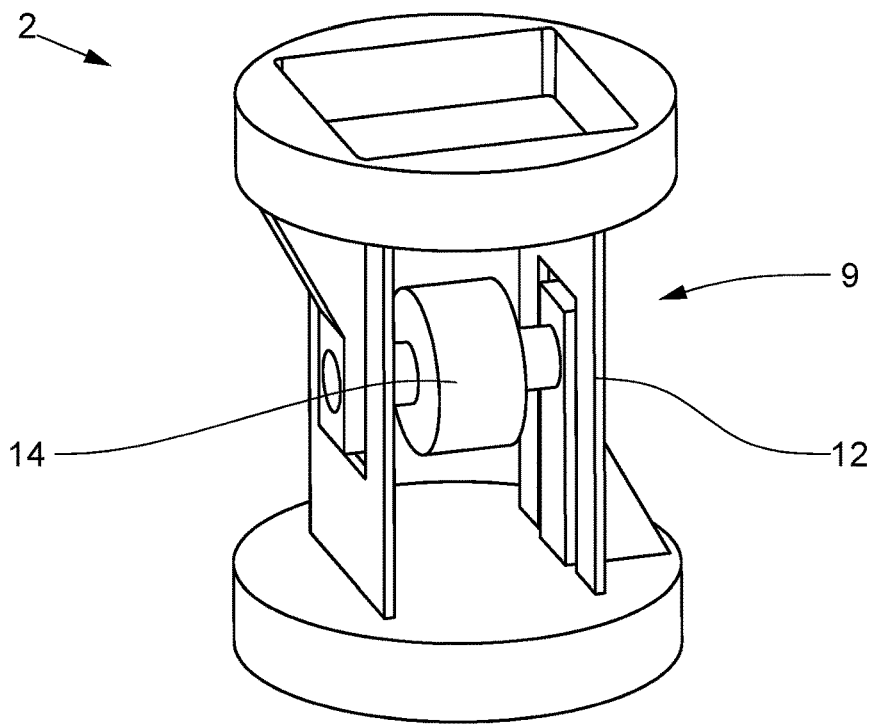
FIG. 3 illustrates a further embodiment of a sensor unit according to the invention.

FIG. 3 shows a further embodiment of a sensor unit according to the invention, wherein the means 9 for capturing the deflection of the sensor 5 is not designed as a strain gauge 13 but as a force gauge 14 which is arranged between the leaf springs 12.

Figure 4:
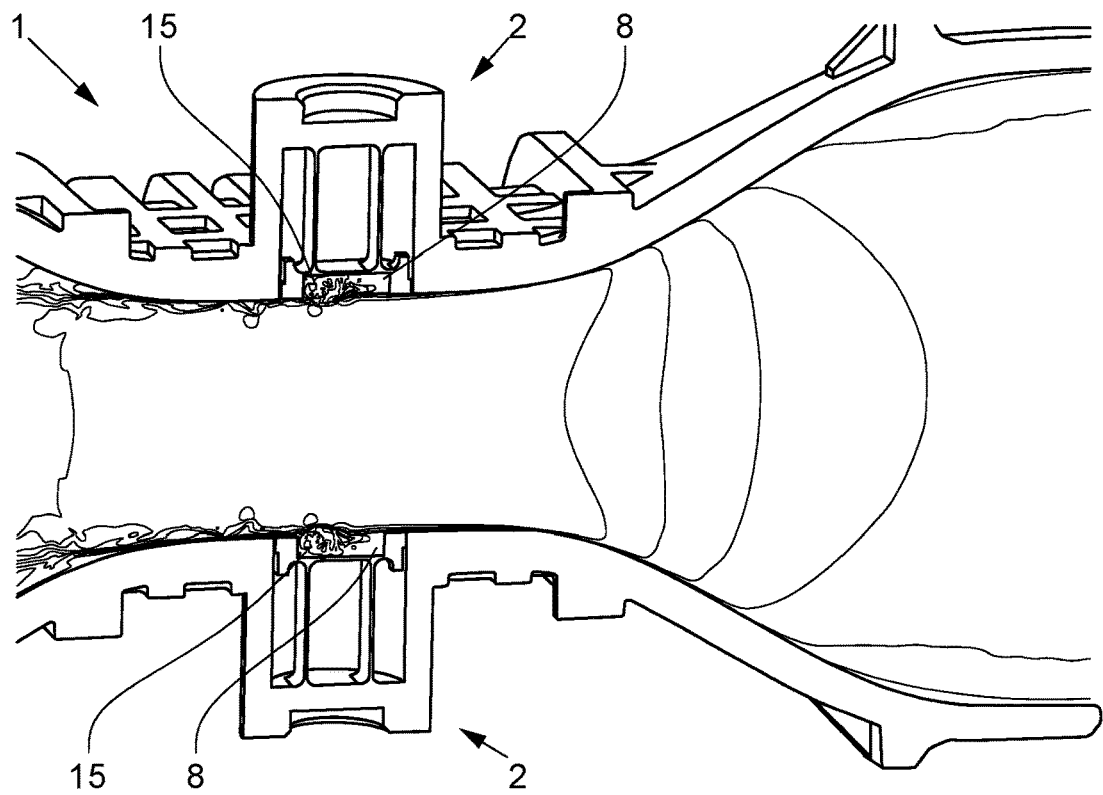
FIG. 4 illustrates a further embodiment of a measuring device according to the invention.

FIG. 4 shows a further embodiment of a measuring device 1 according to the invention, wherein the measuring device 1 has two sensor units 2 according to the invention, which are integrated opposite one another in the respective measuring tube wall. In the illustrated embodiment, the cavities 8 of the sensor units 2 have the same shape. According to another embodiment, it is equally conceivable that the cavities 8 have a different shape and/or size.

Also shown is the medium flowing through the measuring tube 3, wherein the medium forms vortices 15 in each of the cavities 8, which detach from the sensor 5 after a critical limit value has been exceeded and thus excite the sensor 5 to oscillation. This effect can be used during operation to determine the flow velocity of the medium.

In addition to the deflection of the measuring sensor 5 by the flowing medium, or as an alternative, the measuring sensor 5 can also be actively deflected and excited into oscillation of its eigenfrequency, wherein the change of the free oscillation in the medium to the oscillation in the reference state is captured and evaluated for measuring the density and/or viscosity. For example, the measuring sensor 5 can be deflected by a means for active deflection 16, which, in the following embodiment, is designed as an electromagnet 17. This is shown in FIGS. 5a to 5c.

Figure 5A:
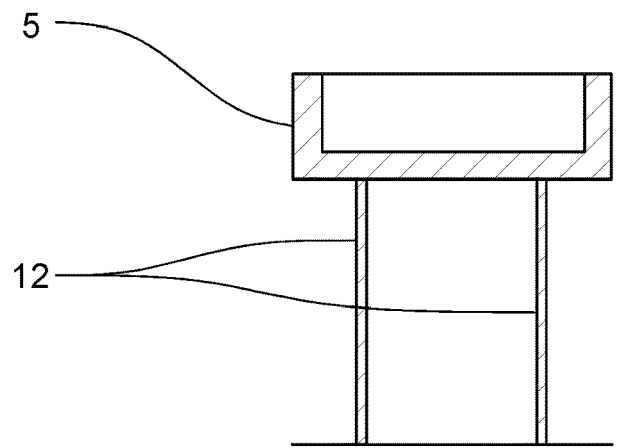
FIGS. 5a-5c illustrate the active deflection of a measuring sensor.
Figure 5B:
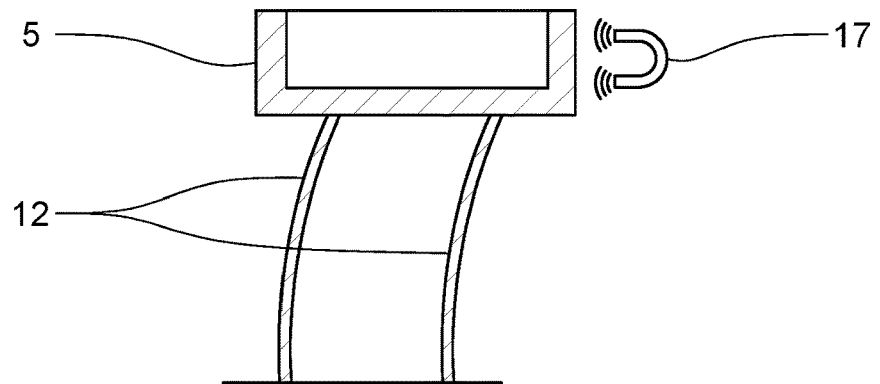
Figure 5C:
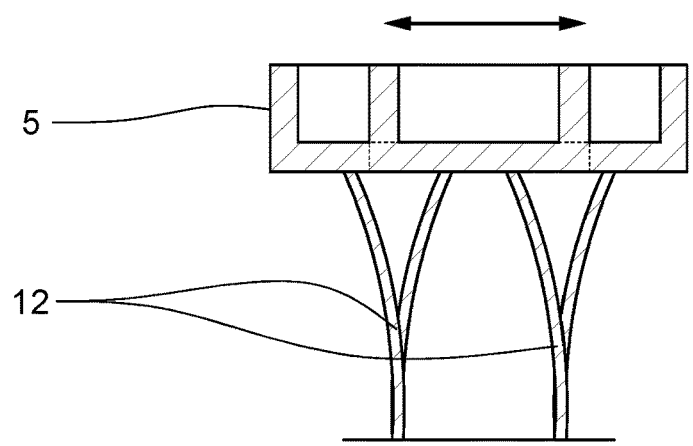

FIG. 5a shows the state of the sensor 5 in the non-deflected state. FIG. 5b shows the state in which an electromagnet 17 deflects the sensor, and FIG. 5c shows the state in which the sensor 5 oscillates at its eigenfrequency.

Figure 6:
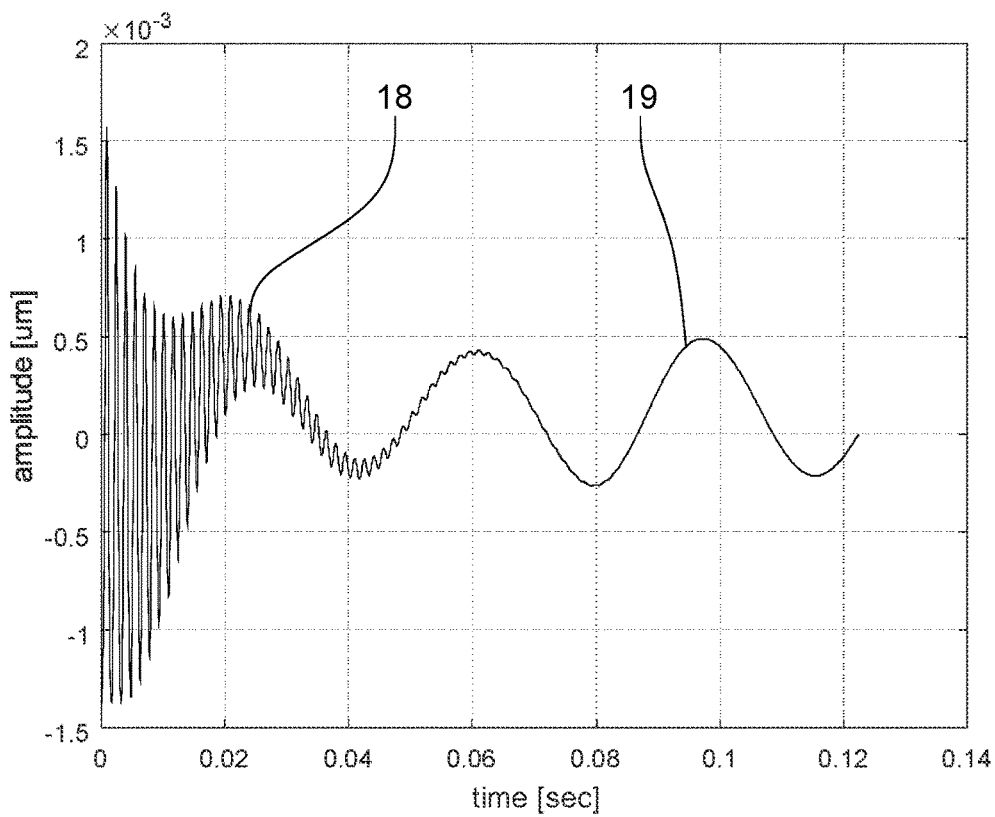
FIG. 6 illustrates a graphical representation of the behavior of the sensor unit according to the invention during operation.

FIG. 6 shows in graphical representation the behavior of the measuring sensor 5 during operation when it is excited to oscillation in interaction with the flowing medium, as described above, and is also actively excited to oscillation at its eigenfrequency. The illustration shows that the eigenfrequency 18 of the measuring transducer 5 is much higher than the frequency 19 of the oscillation generated by the shedding of the vortices of the flowing medium. In an advantageous manner, these oscillations can therefore be evaluated separately. In this respect, a sensor unit 2 according to the invention can be used to determine both the flow velocity and the density of the medium as well as the viscosity of the medium.

Figure 7:
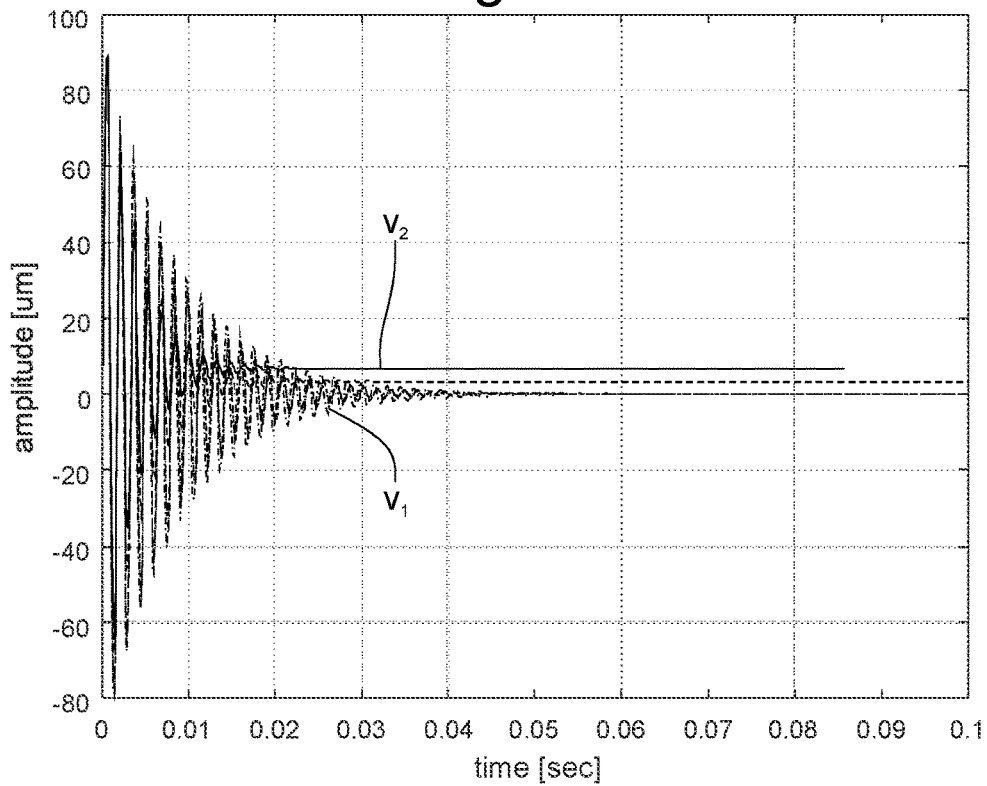
FIG. 7 illustrates a graphical representation of the subsiding of the measuring sensor after active deflection.

FIG. 7 shows a graphical representation of the subsiding of the measuring sensor 5 after an active deflection for media of different density or different viscosity. The illustration shows that the measuring sensor oscillates longer in media with a low viscosity $V_1$ than in media with a higher viscosity $V_2$. In addition, the illustration shows that the transducer has an offset of the deflection that depends, among other things, on the viscosity or density of the medium.

The following relationship applies to the offset of the deflection:

$$\overline{F}_D = C_D \cdot \tfrac{1}{2} \cdot \rho \cdot U^2 \cdot A,$$

where $F_D$ corresponds to the measured deflection force, $\rho$ to the density, $U$ to the flow velocity, $A$ to the contact area and $C_D$ to the viscosity-dependent deflection coefficient. In this respect, the capture of the deflection offset can also be used to determine the density and/or viscosity of the medium.

Figure 8:
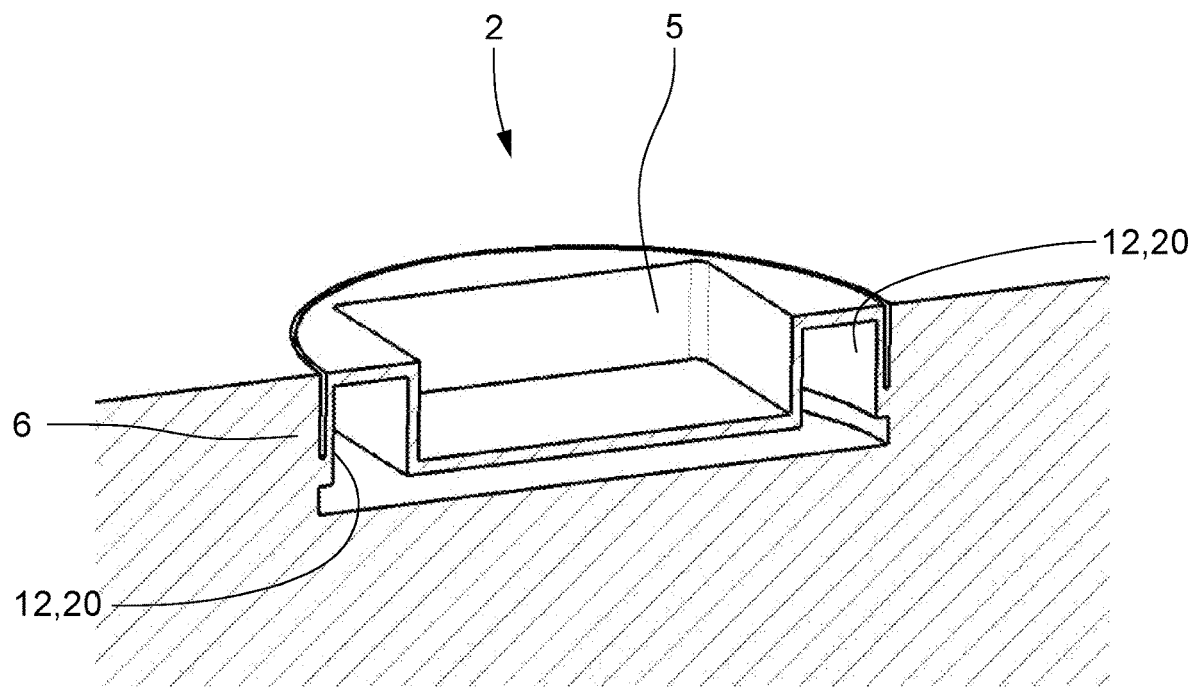
FIG. 8 illustrates a further embodiment of a sensor unit according to the invention.

FIG. 8 shows a further embodiment of a sensor unit 2, wherein the measuring sensor 5 is directly connected to the measuring tube wall via a membrane 20 or via leaf springs 12, so that the stationary base unit 6 is formed by the measuring tube wall itself.

Figure 9:
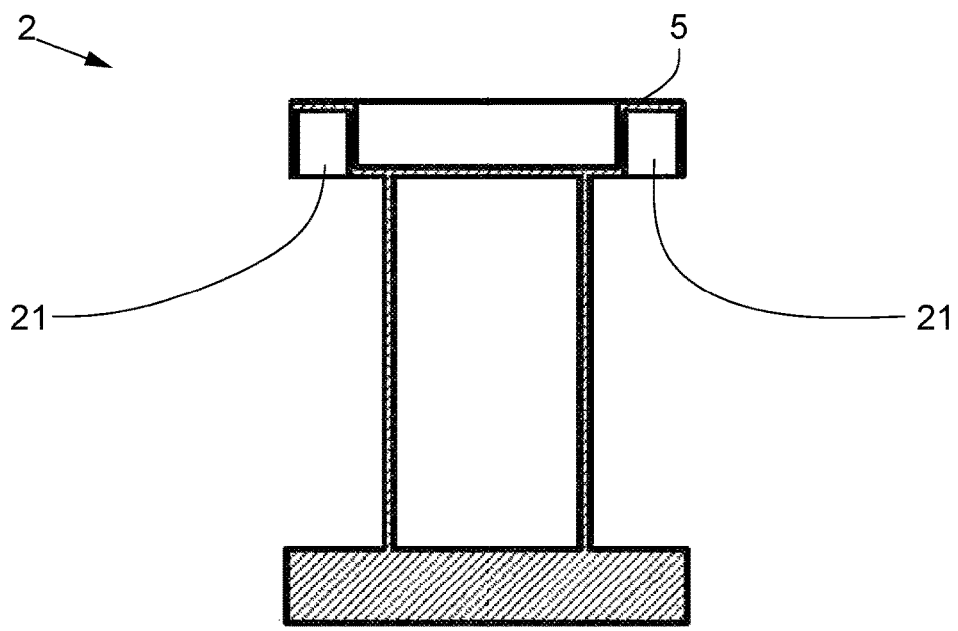
FIG. 9 illustrates a further embodiment of a sensor unit according to the invention.

In principle, it is particularly advantageous if the mass of the measuring sensor 5 is as low as possible so that the measuring effect is maximized. FIG. 9 therefore shows an embodiment of a sensor unit 2, wherein the measuring sensor 5 has material recesses 21 for reducing the mass.

Figure 10:
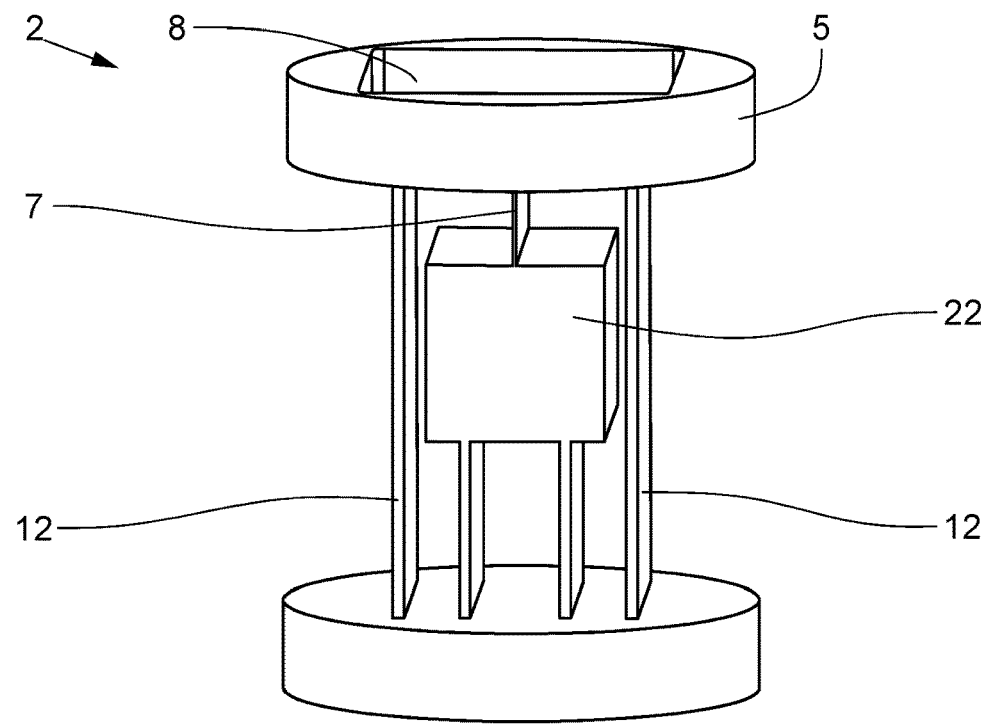
FIG. 10 illustrates a further embodiment of a sensor unit according to the invention.

FIG. 10 shows a further embodiment of a sensor unit 2 according to the invention, wherein a further mass unit 22 is present, which is connected to the measuring sensor 5 by means of a further spring element 7, so that the combination of the measuring sensor 5 and the mass unit 22 forms a double-coupled mass-spring system. In this case, the measuring sensor 5 and the additional mass unit 22 have the same eigenfrequencies. In the reference state, this system therefore oscillates harmonically in the common eigenfrequency after excitation.

If the mass of the measuring sensor 5 changes, for example due to the presence of medium in the cavity 8, the system goes out of resonance, which can be captured, for example, by detecting the amplitude difference between the oscillations of the mass unit 22 and the measuring sensor 5. This embodiment is particularly sensitive with regard to measuring the density of the medium, since even small changes in the mass of the measuring sensor 5 are particularly easy to detect.

Figure 11:
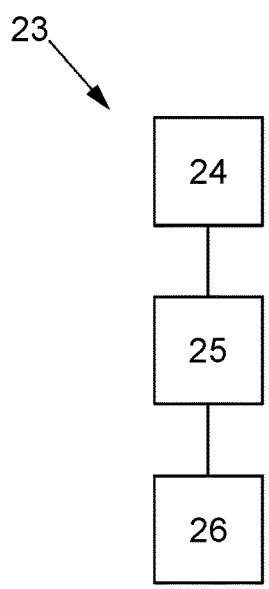
FIG. 11 illustrates a first embodiment of a method according to the invention.

FIG. 11 shows a first embodiment of a method 23 according to the invention for determining at least one parameter of a flowing medium by means of a measuring device 1 shown in FIG. 1. The method 23 has the following steps:

In a first step 24, the measuring sensor 5 is excited to oscillate in and against the direction of flow of the flowing medium. The frequency and/or the amplitude of the oscillation of the measuring sensor 5 is captured 25 by the means 9 for detecting the deflection. The at least one parameter is subsequently determined 26 by the control and evaluation unit 4 using the measured frequency and/or the amplitude.

Figure 12:
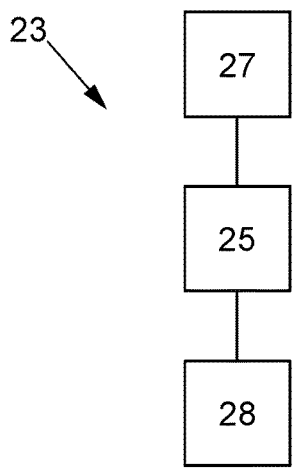
FIG. 12 illustrates a further embodiment of the method according to the invention.

According to the embodiment of the method 23 shown in FIG. 12, the measuring sensor 5 is deflected by the flowing medium and excited 27 to oscillation.

Subsequently, the frequency of the oscillation of the measuring sensor 5 is captured 25.

By means of the correlation $$St = \frac{f \cdot D}{U},$$

with St=Strouhal number, f=detachment frequency [Hz], U=flow velocity [m/s] and D=characteristic size of the cavity, e.g. extent or depth [m], where the detachment frequency corresponds to the oscillation frequency of the sensor, the flow velocity of the medium can be determined in a next step 28.

Figure 13:
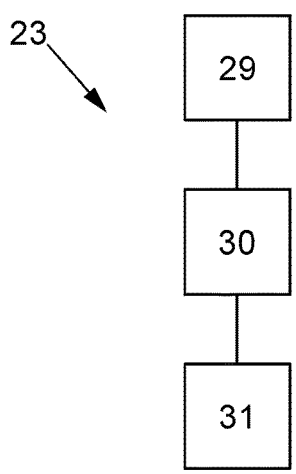
FIG. 13 illustrates a further embodiment of the method according to the invention.

According to a next embodiment of the method 23 shown in FIG. 13, the measuring sensor 5 is actively deflected in a first step 29 and excited to oscillate at its eigenfrequency. Subsequently, the frequency of the natural oscillation is captured and compared 30 with a stored value corresponding to the eigenfrequency in the reference state.

From the comparison, the density of the medium is determined in a next step 31, wherein it must also be taken into account when determining the density of the medium that the value of the eigenfrequency changes simultaneously due to the deviation of the viscosity of the medium from the reference state.

Figure 14:
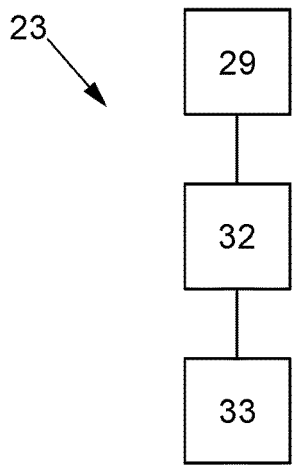
FIG. 14 illustrates a further embodiment of a method according to the invention.

According to the method shown in FIG. 14, after the active excitation 29, the change in the amplitude of the eigenfrequency over time and, to that extent, the damping of the oscillation is captured 32. The viscosity of the medium can then be determined 33 from the damping.

The embodiments illustrated in FIGS. 12 to 14 can be implemented either individually or in all combinations.

Thus, the embodiments shown have the advantage that a particularly flexible determination of different properties of a flowing medium is possible by means of the measuring device according to the invention.

The invention claimed is:

1. A measuring device with a measuring tube suitable for guiding a medium, comprising:
    at least one sensor unit designed for capturing at least one parameter of a medium, wherein the sensor unit is at least partially integrated in the measuring tube wall of the measuring tube;
    at least one control and evaluation unit; and
    at least one deflectable measuring sensor with at least one cavity and at least one stationary base unit;
    wherein the measuring sensor is connected to the base unit via at least one spring element, wherein the base unit is arranged outside the interior of the measuring tube;
    wherein at least one side of the measuring sensor is in contact with the medium during operation, and wherein the cavity is arranged on the side of the measuring sensor facing the medium;
    wherein the measuring sensor is integrated into the measuring tube wall in such a way that it can be deflected at least in the plane of the measuring tube wall; and
    wherein the sensor unit has a means for capturing the deflection of the measuring sensor.

2. The measuring device according to claim 1, wherein the sensor unit is arranged in the measuring tube in such a way that the side of the measuring sensor facing the medium is arranged essentially planar to the inner wall of the measuring tube.

3. The measuring device according to claim 1, wherein the means for capturing the deflection of the measuring sensor is designed as at least one of a piezoelectric element, a strain gauge, an inductive sensor, a capacitive sensor, an optical sensor, and a force gauge.

4. The measuring device according to claim 1, wherein the spring element is designed as a bending spring.

5. The measuring device according to claim 1, wherein a means for active deflection of the measuring sensor is provided.

6. The measuring device according to claim 5, wherein the means for active deflection is designed as an electromagnet and/or as a piezoelectric element.

7. The measuring device according to claim 1, wherein the extension of the cavity in a possible flow direction of the medium is greater than the depth of the cavity.

8. The measuring device according to claim 1, wherein the deflectable measuring sensor is connected to a mass unit via a further spring element, so that the combination of the measuring sensor and the mass unit forms a coupled spring-mass system.

9. A sensor unit for determining at least one parameter of a medium, for installation in the measuring tube wall of a measuring tube through which the medium flows, comprising:
    at least one deflectable measuring sensor with at least one cavity and at least one fixable base unit;
    wherein the sensor is connected to the base unit via at least one spring element;
    wherein at least one side of the measuring sensor is in contact with the medium during operation, and wherein the cavity is arranged on the side of the measuring sensor facing the medium; and
    wherein the sensor unit has a means for capturing the deflection of the sensor.

10. The sensor unit according to claim 9, wherein the sensor unit is designed such that the means for capturing the deflection of the sensor is at least one of a piezoelectric element, a strain gauge, an inductive sensor, a capacitive sensor, an optical sensor, and a force gauge.

11. A method for determining at least one parameter of a medium by means of a measuring device, wherein the measuring device includes a measuring tube suitable for guiding the medium, at least one control and evaluation unit and also includes at least one sensor unit, wherein the sensor unit is designed to capture the at least one parameter of the medium, wherein the sensor unit is at least partially integrated into the measuring tube wall of the measuring tube, wherein the sensor unit has at least one deflectable measuring sensor with at least one cavity and at least one stationary base unit, wherein the measuring sensor is connected to the base unit via at least one spring element, wherein the base unit is arranged outside the interior of the measuring tube, wherein at least one side of the sensor unit is in contact with the medium, and wherein the cavity is arranged on the side of the sensor unit facing the medium, wherein the sensor unit is integrated into the measuring tube wall in such a way that it can be deflected at least in the plane of the measuring tube wall, wherein the sensor unit has a means for capturing the deflection of the measuring sensor, and wherein the method comprises the following steps:
    exciting the measuring sensor to oscillation in the plane of the measuring tube wall;
    capturing the frequency and/or amplitude of the oscillation by the means for detecting the deflection; and
    determining the at least one parameter from the measured frequency and/or the amplitude by the control and evaluation unit.

12. The method according to claim 11, wherein the excitation of the measuring sensor to oscillation is effected by the flowing medium; and
    wherein the flow velocity of the medium is determined from the frequency of the oscillation of the measuring sensor.

13. The method according to claim 11, wherein a means for active deflection of the measuring sensor is provided; and
    wherein the excitation of the measuring sensor, alternatively or in addition to the excitation by the flowing medium, is effected by the means for active deflection.

14. The method according to claim 13, wherein the density of the flowing medium is determined from the frequency of the natural oscillation of the measuring sensor and/or the viscosity of the medium is determined from the damping of the oscillation of the measuring sensor.

15. The method according to claim 11, wherein the deflectable measuring sensor is connected to a mass unit via a further spring element, so that the combination of the measuring sensor and the mass unit forms a coupled spring-mass system;
    wherein the coupled spring-mass system is excited to oscillation;

wherein the change in the mass of the measuring sensor caused by the absorption of the medium causes a disturbance of the resonance, so that the density of the flowing medium is determined from the amplitude of the difference between the oscillation of the measuring sensor and the oscillation of the mass unit.

* * * * *